United States Patent [19]

Meissner et al.

[11] 4,173,465
[45] Nov. 6, 1979

[54] METHOD FOR THE DIRECT REDUCTION OF IRON USING GAS FROM COAL

[75] Inventors: David C. Meissner; Charles W. Sanzenbacher, both of Charlotte, N.C.

[73] Assignee: Midrex Corporation, Charlotte, N.C.

[21] Appl. No.: 933,691

[22] Filed: Aug. 15, 1978

[51] Int. Cl.² .................................................. C21B 13/02
[52] U.S. Cl. ............................................... 75/35; 75/91
[58] Field of Search ................................... 75/34, 35, 91

[56] References Cited

U.S. PATENT DOCUMENTS

| | | |
|---|---|---|
| 3,853,538 | 12/1974 | Nemeth ................................ 75/35 |
| 4,040,816 | 8/1977 | Altenhoner et al. ................. 75/35 |
| 4,046,555 | 9/1977 | Lange ................................... 75/35 |

Primary Examiner—M. J. Andrews
Attorney, Agent, or Firm—Ralph H. Dougherty

[57] ABSTRACT

A method for direct reduction of iron in a shaft reduction furnace. Spent gas from the furnace is upgraded in reductant by removal of $CO_2$ and water to form an upgraded gas. A fossil fuel is gasified to produce a hot gas which is tempered with a first stream of upgraded gas. The mixture is desulfurized by reaction with lime to produce hot desulfurized gas. A second stream of upgraded gas is heated and mixed with the hot desulfurized gas to produce hot reducing gas.

6 Claims, 1 Drawing Figure

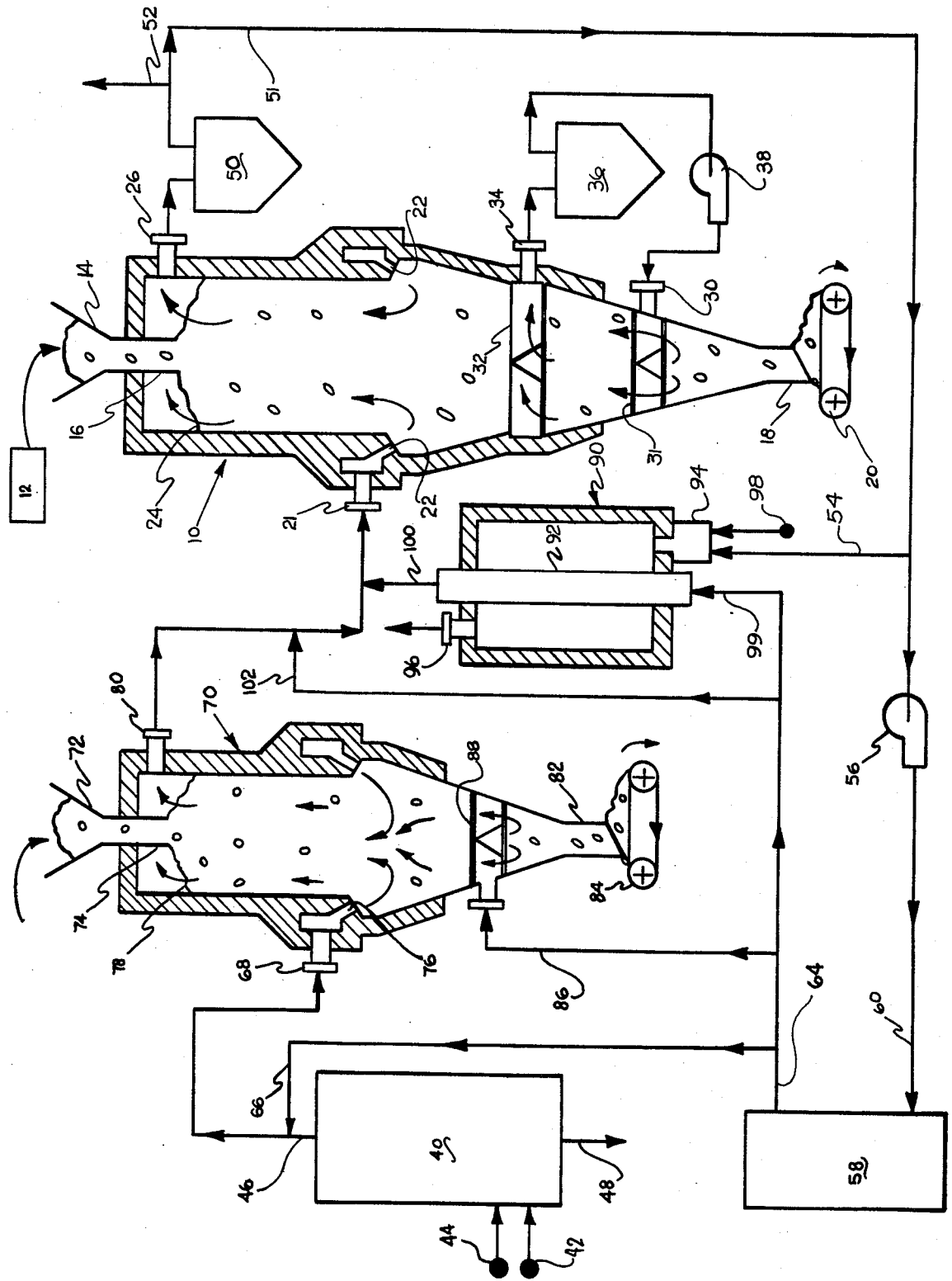

METHOD FOR THE DIRECT REDUCTION OF IRON USING GAS FROM COAL

BACKGROUND OF THE INVENTION

The direct reduction of iron oxide, such as pellets or lump ore, to metallic iron in the solid state has in recent years become a commercial reality in many direct reduction plants throughout the world. The combined annual capacity of these plants currently in operation or under construction is in excess of 15 million metric tons of direct reduced iron product, which is used primarily for feedstock in electric arc steelmaking furnaces. The world demand for additional direct reduced iron is projected to increase at a substantial rate for many years to satisfy a growing world need for such feedstock, as additional electric arc furnace steelmaking plants are constructed.

The majority of the plants producing direct reduced iron utilize natural gas as the source of reductant. The natural gas is reformed to produce the reductants CO and $H_2$. A few plants utilize coal as the source of reductant in rotary kiln processes, such as the SL/RN process, which directly react coal in-situ in the kiln without separately gasifying the coal to CO and $H_2$. The rotary kiln processes have an inherent coal utilization inefficiency in that approximately two-thirds of the coal is burned in the kiln to supply heat and only one-third is used to supply the reducing gas for direct reduction. This inefficiency results in a coal requirement of 5.0 to 6.0 Gcals (Gigacalories) per metric ton of direct reduced iron produced. This is in contrast to 3.0 to 3.5 Gcals of natural gas required per metric ton of direct reduced iron produced in the more efficient natural gas processes such as the Midrex, Purofer or Armco processes.

There are many processes such as set forth in U.S. Pat. No. 3,853,538, not yet commercialized, which gasify coal by partial oxidation with oxygen and steam to produce a gas which is then utilized in different manners in the direct reduction of iron. The principal reason none of these processes has been commercialized is either the process is too complex or impractical for commercialization, or the coal requirements are too high. The basic problem which leads to an impractical process or to a high total coal requirement is that the hot gas from the coal gasifier is too low in reductants (CO plus $H_2$) relative to oxidants ($CO_2$ plus $H_2O$ vapor) to be directly utilized efficiently in the direct reduction of iron.

In the present invention, the hot gas from the coal gasifier is tempered with upgraded spent reducing gas from the reduction furnace and desulfurized by reaction with a sulfur acceptor, preferably lime, to produce a hot desulfurized gas. A second stream of upgraded spent reducing gas is heated by the burning of spent reducing gas and is mixed with the hot desulfurized gas to produce hot reducing gas for the reduction furnace. The invented process achieves high thermal efficiency and makes practical the commercial realization of direct reduction of iron using coal gasification as the source of reductant with the improved coal gasification technology now under development. The present invention requires approximately 3.1 Gcals of coal to be gasified and about 0.4 Gcals of coal for generating electricity at 30% conversion efficiency to produce oxygen for the gasification, for a total coal requirement of approximately 3.5 Gcals per metric ton of direct reduced iron.

OBJECTS OF THE INVENTION

It is the primary object of this invention to provide a thermally efficient and energy efficient process for the direct reduction of iron utilizing gas from coal, in which all spent gas from direct reduction is effectively used in the process to minimize the coal requirement.

It is also an object of this invention to provide an efficient method of directly utilizing hot gas from a coal gasifier in the direct reduction of iron by mixing with upgraded spent reducing gas from the reduction furnace.

It is another object of the invention to provide a method for making hot reducing gas by desulfurizing hot gas from a coal gasifier by reaction with a sulfur acceptor such as lime, and mixing the desulfurized gas with hot reductant-rich recycled spent reducing gas.

It is an object of the invention to re-use spent gas from a direct reduction furnace in a more efficient manner than in prior coal-based direct reduction processes.

BRIEF DESCRIPTION OF THE DRAWING

The single FIGURE is a diagrammatic illustration of the preferred embodiment of the present invention.

DETAILED DESCRIPTION

A refractory lined counterflow shaft type direct reduction furnace is indicated generally in the drawing as 10. Iron oxide feed material 12, in the form of oxide pellets and/or natural lump ore of a nominal particle size in the range of 5 to 30 mm, is fed to a feed hopper 14 and into the furnace through a feed pipe 16 to establish a burden within the furnace. Reduced iron pellets and/or lump product is withdrawn from the lower region of the furnace through a furnace discharge pipe 18 by a discharge conveyor 20, the speed of which controls the rate of descent of the burden through furnace 10.

Fresh hot reducing gas is introduced to furnace 10 through a hot reducing gas inlet pipe 21 and then through a plurality of gas inlet ports 22 arranged in the refractory wall in the middle region of the furnace. The hot reducing gas flows inwardly, then upwardly in counterflow relationship to the descending burden. $CO_2$-rich spent reducing gas exits the burden near the top of the furnace at stockline 24 formed by the angle of repose of the feed from the oxide feed pipe 16. The $CO_2$-rich spent reducing gas, hereafter called top gas, exits the furnace through an offtake pipe 26.

The lower region of furnace 10 is provided with a cooling gas circuit for cooling the reduced iron prior to discharge. This cooling circuit includes a cooling gas inlet 3 leading to a cooling gas distributing member 31 within furnace 10, a cooling gas collecting member 32 positioned above the distributing member within the furnace, a cooling gas outlet member 34, and an external gas recirculating system having a cooler scrubber 36 and a recirculating blower 38.

A fossil fuel gasifier 40, utilizing oxygen or oxygen and $H_2O$ admitted through an injector 42 is used to gasify a pulverized fossil fuel such as coal, lignite or char admitted through a fuel injector 44, in order to produce a hot gasifier gas which leaves the gasifier through pipe 46. Residual ash from the gasification of the fuel is withdrawn from the gasifier 40 through an ash discharge 48.

Top gas leaving furnace 10 through offtake pipe 26 is cooled and scrubbed of dust in a cooler-scrubber 50, then flows into pipe 51. A portion of the cooled top gas is vented from the system through vent pipe 52 to be used as a fuel gas for making steam as later described. A second portion of the cooled top gas is withdrawn through pipe 54 to be used as burner fuel. A third portion of the cooled top gas is compressed by a gas compressor 56 and then is admitted to a conventional regenerative type $CO_2$ removal unit 58 through pipe 60. In the $CO_2$ removal unit, a major portion of the $CO_2$ is removed from top gas to produce a reductant-rich gas which leaves unit 58 through pipe 64. A portion of the reductant-rich gas is fed to a tempering pipe 66 for tempering hot gasifier gas in pipe 46 to a temperature below the ash solidification point. This tempering gas could alternatively be introduced to the gas discharge region of the gasifier 40 where it would have no significant adverse effect on the gasification temperature.

The hot gasifier gas in pipe 46, after being mixed with and partially cooled by tempering gas from pipe 66 is admitted to a gas desulfurizer 70 through a gas inlet pipe 68. Desulfurizer 70 is a refractory-lined counterflow shaft type furnace into the top of which particulate limestone is introduced through feed hopper 72 and feed pipe 74 to form a burden in the desulfurizer. The tempered hot gasifier gas from gas inlet pipe 68 is introduced into the desulfurizer through gas inlet ports 76 arranged in the refractory wall in the middle region of the desulfurizer. This gas flows inwardly through the burden then upwardly in counterflow relationship to the descending burden. Hot desulfurized gas exits from the burden at a stockline 78 and then through an offtake pipe 80. Particulate reacted lime, containing sulfur, and any residual unreacted lime are withdrawn from the desulfurizer through discharge pipe 82 by a discharge conveyor 84. Removal of the reacted particulate material by conveyor 84 via pipe 82 establishes a gravitational burden flow and controls the rate of descent of the burden through desulfurizer 70. A small portion of reductant-rich gas from unit 58 is introduced through pipe 86 to a cooling gas distributing member 88 in the lower region of desulfurizer 70 as cooling gas to cool the burden prior to discharge. This cooling gas flows upwardly through the desulfurizer and is preheated by the hot descending burden before the gas reaches the middle region.

Gas heater 90 is provided for heating reductant-rich gas from pipe 99 to a temperature suitable for use as reducing gas for reduction furnace 10. The heater includes a plurality of heating tubes 92, only one of which is shown, one or more burners 94, and an exhaust gas flue 96. The hot exhaust gases from flue 96 are preferably utilized in a heat exchanger, not shown, to preheat combustion air from a source 98 for burners 94. The fuel for burner 94 is top gas introduced through pipe 54. The heated reductant-rich gas leaves heater 90 through pipe 100, is mixed with hot desulfurized gas from desulfurizer 70 and is tempered with cold reductant-rich gas via pipe 102 to achieve desired furnace inlet gas temperature. This final gas mixture becomes the hot reducing gas introduced to reduction furnace 10 via gas inlet 21.

In the direct reduction of iron, the type of reduction furnace having the highest thermal efficiency is a counterflow type shaft furnace in which the reducing gas and solids being reduced are in counterflow relationship to each other. With such relationship the hot reducing gas serves not only to reduce the iron oxide to metallic iron but also to heat the incoming cold iron oxide feed to reducing temperature.

A counterflow type shaft furnace also has the highest chemical efficiency of any type of reduction furnace, provided that the hot reducing gas admitted to the furnace is of high enough quality. Reducing gas quality is commonly expressed as the ratio of reductants (CO plus $H_2$) to oxidants ($CO_2$ plus $H_2O$) in the gas mixture. Commercial operation experience with natural gas based plants has shown that in order to take full advantage of the inherent chemical efficiency of a counterflow shaft reduction furnace, the quality of the hot reducing gas should be at least about 8.

In the gasification of pulverized solid fossil fuels such as coal or lignite in a partial oxidation type gasifier such as gasifier 40, which produces a hot gasifier gas containing principally CO, $H_2$, $CO_2$ and $H_2O$, the highest quality hot gasifier gas that is practical to be produced commercially today is in the range of about 3 to 4. However, process development and demonstration coal gasifiers are now being constructed which have a goal of producing a better quality hot gas of at least about 6 through improved gasification technology. The present invention provides a method for effectively utilizing such improved quality hot gasifier gas without cooling the gas below the temperature at which it will be introduced to the reduction furnace.

The following description of the operation of the present invention is based on gasifying a typical Western U.S.A. sub-bituminous coal using oxygen, $H_2O$ and pulverized coal in an entrained-bed type gasifier, which will produce hot gas containing principally CO, $H_2$, $CO_2$ and $H_2O$. The gasification temperature in such gasifier is generally about 1400° C. At this temperature the coal ash becomes liquid, is water quenched and removed from the bottom region of the gasifier as slag.

As a specific example of this invention, and referring to the drawing, hot reducing gas having a quality of 10 and at a typical preferred temperature of 815° C. is introduced to reduction furnace 10 via gas inlet 21. The hot gas distributes across the burden in the furnace and then flows upwardly counter to the descending iron oxide burden. CO and $H_2$ in the gas react with the iron oxide to produce $CO_2$ and $H_2O$ and metallic iron by the well-known reduction reactions. Because of the chemical thermodynamics involved in the reduction of iron oxide to metallic iron, only a portion of the initial reductants (CO plus $H_2$) can be reacted before the oxidants ($CO_2$ and $H_2O$) which are formed cause reduction reactions to cease. This thermodynamic situation results in the spent reducing gas, leaving the furnace at offtake pipe 26, having a quality of 1.5. In gas cooler-scrubber 50, much water vapor is condensed and removed from the gas resulting in cooled top gas having a quality of 2.0. This quality gas is a good fuel gas for burning, but it is essentially a neutral gas having no reducing potential for direct reduction of iron.

A minor portion of the 2.0 quality top gas is utilized as the fuel in the burner 94 of gas heater 90. Another somewhat greater but still minor portion of the top gas is vented from the system through vent pipe 52. This vented gas serves as the fuel for firing a boiler, not shown, to generate the steam necessary to operate the $CO_2$ removal unit 58. The major portion of the top gas is passed, or recycled, through the $CO_2$ removal unit 58 wherein most of the $CO_2$ is removed resulting in reductant-rich gas leaving the $CO_2$ removal unit in pipe 64.

This reductant-rich gas, which has a very high quality of 23, is utilized further in the process in four ways.

The hot gasifier gas leaving coal gasifier 40 in pipe 46 is at a temperature of 1370° C. and has a quality of 6.5. The gas contains H₂S and COS from sulfur in the coal, some unreacted coal char and some liquid droplets of ash carryover. To solidify the liquid droplets of ash in the hot gasifier gas to enable it to be transported in pipes, a tempering stream 66 of cool reductant-rich gas is mixed with the hot gas to give a mixture temperature of 950° C. at desulfurizer 70 gas inlet pipe 68. This tempering with cool reductant-rich gas results in a mixture gas quality of 9.0 at gas inlet pipe 68.

Particulate limestone is fed to desulfurizer 70. The particle size is preferably in a range of about 3 to 20 mm in order to have a burden with good gas permeability. The mass flow rate of hot gas admitted to the desulfurizer 70 is very high relative to the mass flow rate of cold limestone fed to the desulfurizer. This results in the limestone being very rapidly heated to gas temperature when still at an elevation just below the stockline 78. This causes the limestone to be very rapidly calcined to burned lime (CaO) which is the proper form of lime for reaction with H₂S and COS and removal of these constituents from the gasifier gas. It will be understood that burned lime could be fed instead of limestone, but this would not be as economical.

The hot gasifier gas is tempered to 950° C. with cool reductant-rich gas before introduction to desulfurizer 70 in order to favor the well-known reactions of H₂S and COS with lime:

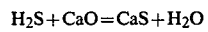
$$H_2S + CaO = CaS + H_2O$$

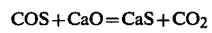
$$COS + CaO = CaS + CO_2$$

The lowering of the oxidant (CO₂ plus H₂O) content in the hot gas by tempering with high quality reductant-rich gas also favors H₂S and COS removal. The sulfur content of the hot gasifier gas for the particular coal selected is about 3900 parts per million volume (ppmv) as H₂S plus COS. At the 950° C. reaction temperature and with the lowered CO₂ plus H₂O content after tempering, the sulfur content of the gas leaving the desulfurizer is about 120 ppmv. This level of sulfur is below the maximum that can be tolerated in the direct reduction of iron, and is even further decreased by mixing with sulfur-free hot or cold reductant-rich gas from pipe 100 or 102. The amount of limestone required depends on the sulfur content of the coal. The amount of CO₂ plus H₂O formed in the desulfurizer by the reaction of sulfur with lime is only a small fraction of the total gas volume and has only minor effect on the quality of the gas leaving the desulfurizer at outlet 80. The CO₂ released in the desulfurizer by the calcining of the limestone to burned lime also has only minor effect on the gas quality. Both of these minor additions of CO₂ plus H₂O are included in the tabulations hereinafter shown.

In desulfurizer 70, the hot burden leaving the reaction zone is cooled before discharge by admitting a relatively small flow of reductant-rich gas from pipe 86 to cooling gas distributing member 88. This high quality cooling gas flows upwardly and is forced toward the center of the reaction zone by the incoming gas from ports 76, after being preheated by the hot descending burden in the cooling zone.

A portion of the reductant-rich gas leaving CO₂ removal unit 58 through pipe 64 is admitted to the gas heater 90 through pipe 99. In the heater, which includes a plurality of heat resistant alloy heating tubes 92, the gas is heated to a temperature of about 815° C. which is a preferred operating temperature for direct reduction of most types of iron oxide feed materials. This temperature could be between 760° and 900° C. without departing from the present invention.

In the example, the gas exiting desulfurizer 70 through gas outlet 80 is at a temperature of 915° C., C, after having heated the incoming cold limestone and calcining the limestone to burned lime. This 915° C. gas is cooled to about 815° C. by the admission of and mixing with a relatively small flow of reductant-rich tempering gas from pipe 102. It will be understood that the addition of reductant-rich tempering gas through pipe 102 can be eliminated by simply heating the reductant-rich gas in heater 90 to a temperature less than 815° C. in order to achieve a reducing gas mixture temperature of approximately 815° C. at reducing gas inlet 21. The addition of tempering gas through pipe 102 simply makes it easier to control the temperature of the hot reducing gas admitted to reducing gas inlet 21.

The following tables give a comprehensive process analysis of the invented process and are keyed to the drawing. These data are to be understood as being merely illustrative and in no way limiting. All of the tabulations are based on one metric ton of direct reduced iron produced, having a degree of metallization of 92 percent and a carbon content of 1.5 percent. These are widely accepted commercial standards for direct reduced iron made in natural gas based direct reduction plants.

Table I shows the gas flow rates and gas quality (reductant to oxidant ratio) at the locations on the drawing as indicated.

TABLE I

GAS FLOWS

| Item | Flow Sheet Number | Flow In *nm³ | Gas Quality |
|---|---|---|---|
| Gasifier Gas | 46 | 931 | 6.5 |
| Temper Gas | 66 | 532 | 23.0 |
| Gas Mixture to Desulfurizer | 68 | 1463 | 9.0 |
| Gas Leaving Desulfurizer | 80 | 1511 | 8.5 |
| Temper Gas | 102 | 220 | 23.0 |
| Heater Gas | 100 | 238 | 23.0 |
| Reducing Gas | 21 | 1969 | 10.0 |
| Spent Reducing Gas | 26 | 1957 | 1.5 |
| Cooled Top Gas | 51 | 1782 | 2.0 |
| Top Gas Vent | 52 | 48 | 2.0 |
| Top Gas Fuel | 54 | 269 | 2.0 |
| Reductant-Rich Gas | 64 | 1031 | 23.0 |
| Desulfurizer Cooling Gas | 86 | 41 | 23.0 |

*Normal cubic meters

Note:
Spent Gas Flow at outlet 26 is less than reducing gas flow at inlet 21 because 1.5% carbon is added to the direct reduced iron by reaction with the CO from the reducing gas.

Table II shows the feed requirements for the coal gasifier 40.

TABLE II

COAL GASIFIER

| | |
|---|---|
| Dry Coal (kg) | 488 |
| H₂O (kg) | 93 |
| Oxygen (nm³ of 98% O₂) | 235 |

Table III shows the feed requirements and the outputs of desulfurizer 70.

TABLE III

DESULFURIZER
(all units are kg)

| | |
|---|---|
| Limestone in | 32.6 |
| CaO out | 9.1 |
| CaS out | 11.7 |

Table IV shows the energy requirements for the invented process.

TABLE IV

ENERGY

| | |
|---|---|
| Gasifier Coal | 3.1 Gcal |
| Oxygen Plant Coal | 0.4 Gcal* |

*approximately 140kWh at 30% conversion efficiency

Table V shows the gas temperatures at the indicated locations in the process.

TABLE V

GAS TEMPERATURES

| Item | Flow Sheet Number | Temperature Degrees C. |
|---|---|---|
| Gasifier Gas | 46 | 1370 |
| To Desulfurizer | 68 | 950 |
| Out Desulfurizer | 80 | 915 |
| Reducing Gas | 21 | 815 |
| Gas Heater Flue Gas | 96 | 925 |
| Gas Heater Burner Air | 98 | 450 |

Table VI shows the gas analyses at the indicated locations in the process.

TABLE VI

GAS ANALYSIS

| Item | Flow Sheet Number | % CO | % $CO_2$ | % $H_2$ | % $H_2O$ | % $CH_4$ | % $N_2$ | ppmv ($H_2S$ + COS) |
|---|---|---|---|---|---|---|---|---|
| Gasifier Gas | 46 | 55.5 | 5.5 | 30.0 | 7.7 | 0.1 | 0.9 | 3900 |
| To Desulfurizer | 68 | 53.5 | 4.2 | 34.4 | 5.6 | 0.2 | 1.9 | 2500 |
| Out Desulfurizer | 80 | 52.4 | 5.3 | 35.1 | 5.1 | 0.2 | 1.9 | 120 |
| Reducing Gas | 21 | 51.8 | 4.5 | 36.8 | 4.3 | 0.2 | 2.3 | 90 |
| Spent Reducing Gas | 26 | 32.0 | 24.1 | 27.0 | 14.4 | 0.2 | 2.3 | 0 |
| Top Gas | 51 | 35.1 | 26.5 | 29.6 | 6.0 | 0.2 | 2.6 | 0 |
| Reductant-Rich Gas | 64 | 49.9 | 2.0 | 42.1 | 2.0 | 0.3 | 3.6 | 0 |

The gasifier gas flow in pipe 46 as shown in the example is 931 nm$^3$ per metric ton of direct reduced iron product. This gas contains 85.5% reductants CO plus $H_2$ or 796 nm$^3$ of these reductants. The hot reducing gas flow at inlet pipe 21 is 1969 nm$^3$ of which 88.6% or 1744 nm$^3$ is CO plus $H_2$ reductants. Thus only 46% of the CO plus $H_2$ required for direct reduction in furnace 10 is provided by gasifier 40. The remaining 54% of the reducing gas requirement is provided by recycling spent gas from the direct reduction furnace.

Although a counterflow type shaft desulfurizer has been described for desulfurizing the gas, it will be understood that this gas desulfurizing can be accomplished in process apparatus other than a shaft, such as a fluidized bed of lime particles, without departing from the basic concept of the present invention. Further, as an alternative to lime, the desulfurizing agent can be any other suitable sulfur acceptor such as manganese oxide.

It can readily be seen from the foregoing that we have provided an energy efficient, thermally efficient, useful and practical process for achieving direct reduction of iron utilizing coal gasifier gas as the source of reductant for the direct reduction.

What is claimed is:

1. In a method for reducing iron oxide in a direct reduction furnace wherein hot reducing gas is introduced to said furnace to reduce the iron oxide therein to a metallized iron product and to form a $CO_2$ containing spent reducing gas, the improvement comprising:
   a. removing a substantial portion of the $CO_2$ from said spent reducing gas to form a reductant-rich gas;
   b. gasifying fossil fuel to form a hot gasifier gas;
   c. tempering said hot gasifier gas with a first stream of said reductant-rich gas to form a hot gas mixture;
   d. reacting said hot gas mixture with a sulfur acceptor to form a hot desulfurized gas;
   e. heating a second stream of said reductant-rich gas; and
   f. mixing said heated second stream of reductant-rich gas with hot desulfurized gas to form a reducing gas having a quality of at least about 8 and a temperature of from about 760° to about 900° C. for introduction to said furnace.

2. A method according to claim 1 wherein said sulfur acceptor is lime.

3. A method according to claim 1 wherein said gasifier gas has a quality of at least about 6.

4. A method according to claim 1 wherein a portion of the $CO_2$ containing spent reducing gas is used as fuel to heat said second stream of reductant-rich gas.

5. A method according to claim 1 wherein said fossil fuel is selected from the group consisting of coal, lignite and char.

6. A method according to claim 1 further comprising mixing a third stream of unheated reductant-rich gas with said desulfurized gas to control the reducing gas temperature.

* * * * *